United States Patent [19]

Hutzenlaub

[11] Patent Number: 4,637,103
[45] Date of Patent: Jan. 20, 1987

[54] SIMULTANEOUS BIAXIAL STRETCHING MACHINE FOR THERMOPLASTIC FILM WEBS

[75] Inventor: Armin Hutzenlaub, Wiehl, Fed. Rep. of Germany

[73] Assignee: Kampf GmbH & Co. Maschinenfabrik, Fed. Rep. of Germany

[21] Appl. No.: 826,581

[22] Filed: Feb. 6, 1986

[30] Foreign Application Priority Data

Feb. 6, 1985 [DE] Fed. Rep. of Germany ....... 3503909

[51] Int. Cl.$^4$ ............................................. B29L 55/16
[52] U.S. Cl. ......................................................... 26/73
[58] Field of Search ............................................. 26/73

[56] References Cited

FOREIGN PATENT DOCUMENTS 1259558 1/1968 Fed. Rep. of Germany .......... 26/73
2841510 6/1980 Fed. Rep. of Germany .......... 26/73

*Primary Examiner*—Robert R. Mackey
*Attorney, Agent, or Firm*—Bacon & Thomas

[57] ABSTRACT

A simultaneous biaxial stretching machine for thermoplastic film webs, said machine having two transport rails arranged on both borders of the film web, on which transport rails gripping devices for the gripping of the borders of the film web are guided, each coupled with one another by flexible connecting elements and having a roller moving mechanism, the gripping devices being guided at constant small distance in a preheating zone, divergently and at an increasing mutual distance within a stretching zone, and in parallel or convergently within a fixing zone. Each gripping device has an extension arm, oriented rectangularly to the moving direction of the gripping device, the extension arm having a slide, guided therein. Each gripping device, in addition, has a deflection roller for the deflection of the connecting element, coming from the adjacent gripping device. The deflected end of the connecting element is fastened on the slide, and the slide is guided on a guide rail which extends at the side of the transport rail at a variable adjustable distance.

15 Claims, 3 Drawing Figures

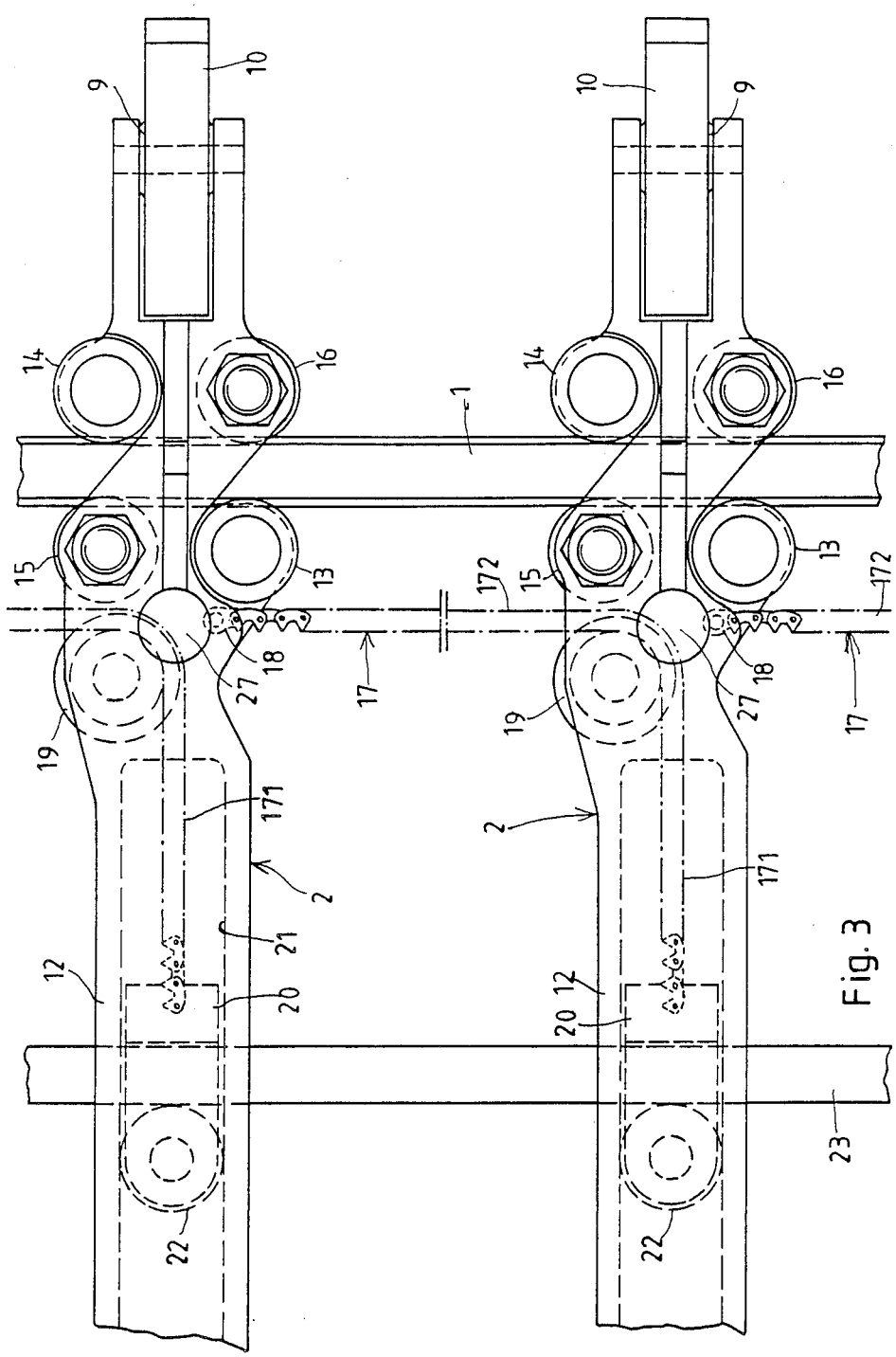

SIMULTANEOUS BIAXIAL STRETCHING MACHINE FOR THERMOPLASTIC FILM WEBS

BACKGROUND OF THE INVENTION

1. Field of the Invention

The invention relates to a simultaneous biaxial stretching machine for thermoplastic film webs, said machine having two transport rails arranged on both borders of the film web, on which transport rails gripping devices for the gripping of the borders of the film web are guided, each coupled with one another by flexible connecting elements and having a roller moving mechanism, the gripping devices being guided at constant small distance in a preheating zone, divergently and at an increasing mutual distance within a stretching zone, and in parallel or convergently within a fixing zone.

2. Description of the Prior Art

For a simultaneous biaxial stretching, it is necessary to spread the gripping devices within the stretching zone in the latitude direction as well as in the longitudinal direction. The moving apart in the latitude direction does not offer any difficulties by appropriate arrangement of the rails. Numerous systems are known for the moving apart in the longitudinal direction. Due to the high tensile forces within the entire machine it is necessary to design these systems in such a manner that additional forces are kept to a minimum. Particularly interfering transverse forces are significant here, which occur in link chains and may amount up to a 17-fold amount of the longitudinal force.

A simultaneous biaxial stretching machine according to the German-PS No. 28 41 510 utilizes as connecting elements band-like elements, which in each case connect two adjacent gripping devices and are adapted to be wound up on a drum within each gripping device. The drum is operated via a self-locking worm gear. The drive wheel of the worm gear is actuated by means of a chain, which extends in parallel with the rail. A constant changing ratio of the distance between the gripping devices results in each case over the length of the chain. Due to the fact that the longitudinal force within a simultaneous biaxial stretching machine is in the order of 10 000N, it is necessary to use comparatively massive and solid bands, because the bands alone transmit the tensile force between adjacent gripping devices. Such massive bands require, for the winding up, a drum of considerable diameter. Also the worm gear cannot be reduced at will, if it shall resist permanently the forces occurring. On the other hand, a minimal distance of the gripping devices of 50 mm in the compressed condition of the gripping devices has proved to be useful. On the basis of this amount it is possible to provide, on the one hand, the gripping devices mechanically stable and, on the other hand, the distances of the gripping positions for the web are still tolerable even in the moved-apart condition of the gripping devices. It turned out that the drum and the worm gear for the band-like connecting elements cannot be reduced to this size so that in the case of the prior art apparatus the necessary minimum distances between the gripping devices cannot be reached under operating conditions.

SUMMARY OF THE INVENTION

An object of the invention is such a provision of a simultaneous biaxial stretching machine that the connecting elements, on the one hand, are adapted to the minimum distance between the gripping devices and, on the other hand, do not create any inadmissible and interfering transverse forces and that an individual pointwise adjustment of the change of the longitudinal stretching ratio is possible.

According to the invention, this object is solved in that each gripping device has an extension arm, oriented perpendicularly to the moving direction of the gripping device, the extension arm having a slide, guided therein, that each gripping device, in addition, has a deflection roller for the deflection of the connecting element, coming from the adjacent gripping device, that the deflected end of the connecting element is fastened on the slide, and that the slide is guided on a guide rail which extends at the side of the transport rail at a variable adjustable distance.

The invention differs from the prior art in that each connecting element is deflected on a gripping device and is linearly displaced transversely to the moving direction of the gripping device. This displacing is effected by means of a guide rail. Substantially exactly the longitudinal tensile force of the gripping device arrangement acts upon this guide rail as transverse force. An increase of the transverse force as in the case of a link chain does not occur. The moving apart of the gripping devices in the longitudinal direction may be influenced by the shape and the adjustment of the guide rail individually on each position. This is important particularly for the fixing zone, where a longitudinal shrinkage may be adjusted in different longitudinal sectors.

For the reduction of the friction on the guide rail, it is provided that the slide comprises a guide roller which rolls on the guide rail.

In order to avoid overturning moments about the vertical axis of each gripping device, it is provided that the moving direction of the slide and of the deflected connecting element intersects the vertical axis of symmetry of the moving mechanism of the gripping device.

In order to avoid also overturning moments around the longitudinal axis of the gripping device, it is provided that all the connecting elements are situated in the same horizontal plane, which coincides approximately with the center of the gripping device moving mechanism.

For the reduction of the overturning moments about the transverse axis, it is provided that the said horizontal plane is situated in one plane with the guide roller and the film gripping position.

A loading, as uniform as possible, of the transport rail is guaranteed by positioning the horizontal plane of the connecting elements not higher than the center of the upper moving mechanism rollers and not deeper than the center of the lower moving mechanism rollers.

In order to exclude effective moments by the longitudinal force of the connecting elements, it is provided that all the connecting elements extend in one line in parallel with the transport rail.

It is also possible on the guide rail to suppress overturning moments about the longitudinal axis of the gripping device in that the guide rail comprises a guide track for the guide roller.

In the return path, every transverse force to the gripping devices can be avoided in that the slide is movable up to a limit stop on the gripping device whereby the connecting elements reach their maximum length in the moving direction. By an opening device, the film web is released so that the gripping devices can be moved into the position of the largest distance, without influencing the film web. Then the gripping devices are coupled to one another merely in the longitudinal direction, without effecting the connecting elements.

In this manner, it is also possible to dispense with the guide rail in the return path, in that the gripping devices are guided on a transport rail section alone subsequent to an outlet deflection guide along a return path.

In order to avoid moments also in case of a movement of the gripping devices by deflection wheels or similar driving means, it is provided that driving pins of the gripping devices are arranged in the vertical plane of the connecting elements running in parallel with the transport rail.

Moments about the transverse axis are avoided due to the positioning of an upper driving pin and a lower driving pin.

At the end of the inlet deflection arc, the film web can be gripped by the gripping devices because at the inlet to the preheating zone an opening device is provided for the tension levers of the gripping devices. The opening device is arranged eccentrically in regard to the inlet deflection arc and has a smaller diameter than the inlet deflection arc of the transport rails.

In the inlet deflection arc and in the preheating zone, the gripping devices are pushed together in that before the inlet deflection arc a gripping device transport means is provided, which compresses the expanded gripping device chain and guides same in compressed packing through the inlet deflection arc.

A high stability of the connecting elements on the basis of small dimensions is reached in that each connecting element is provided as a multiple lamella chain with rolling hinge bolts.

BRIEF DESCRIPTION OF THE DRAWINGS

One embodiment of the invention will be described in the following with reference to the accompanying drawings, wherein:

FIG. 2 is a partly cut view of a gripping device, while

FIG. 3 is a top view in regard to FIG. 2, with two adjacent gripping devices.

DESCRIPTION OF THE PREFERRED EMBODIMENT

Figure 1:
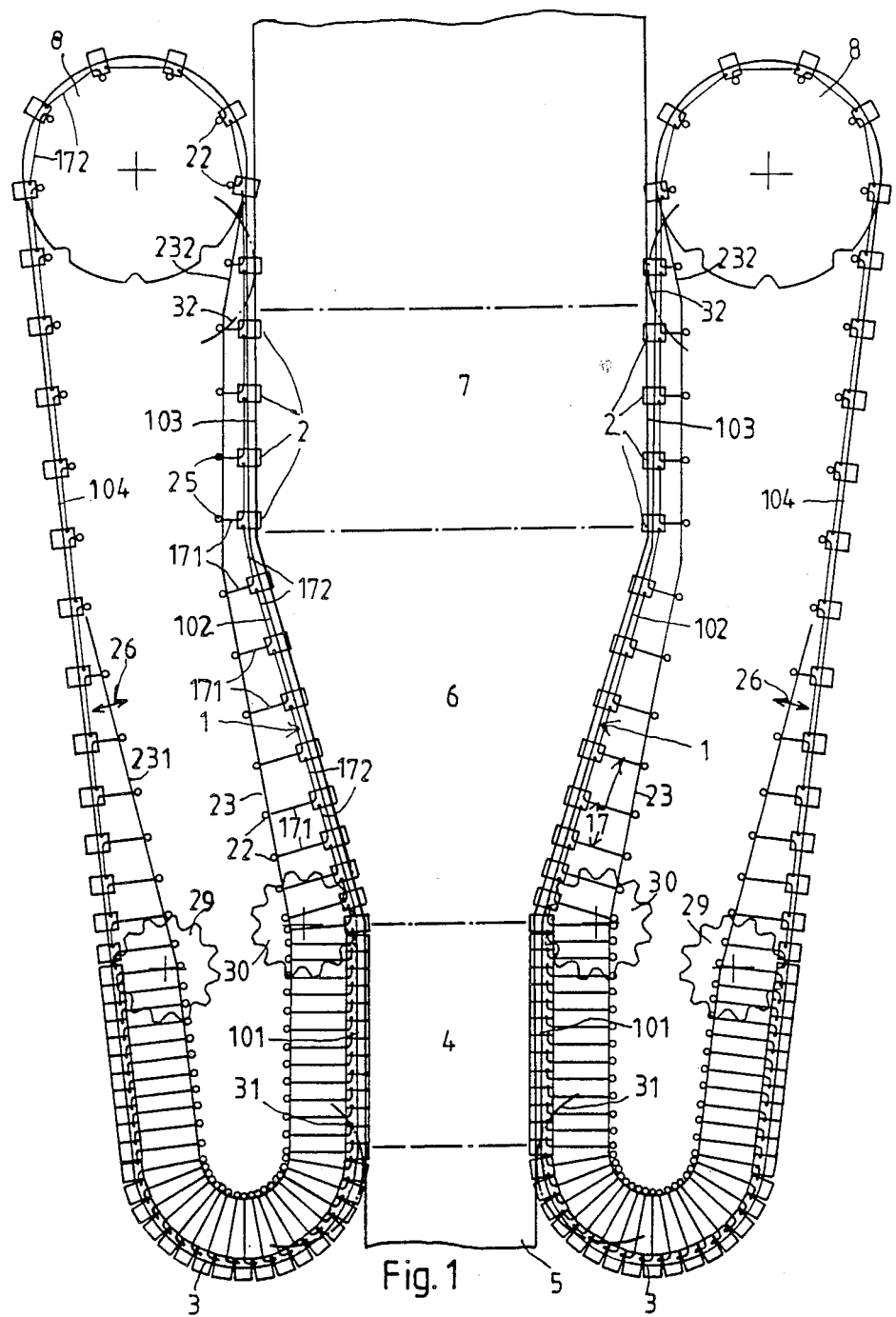
FIG. 1 is a schematic total view of a simultaneous biaxial stretching machine.

A simultaneous biaxial stretching machine according to FIG. 1 comprises, symmetrically to the longitudinal direction of the machine, guideways, which comprise transport rails 1 for a plurality of gripping devices 2. The treatment path joins up with an inlet deflection arc 3 with a preheating zone 4, in which zone transport rail sections 101 are arranged in parallel with one another. A film web 5 is schematically indicated in the treatment path. With the preheating zone 4, a stretching zone 6 joins up, within which transport rail sections 102 extend divergently to one another so that thereby a transverse stretching of the film web is achieved. Within a fixing zone 7, transport rail sections 103 extend in parallel or convergently. The gripping devices 2 are then guided by means of deflection guides 8, such as deflection wheels and deflection rails, into a return path with transport rail sections 104. From this return path, the gripping devices reach the inlet deflection arc 3. Further details of the guideways will be described later on.

Figure 2:
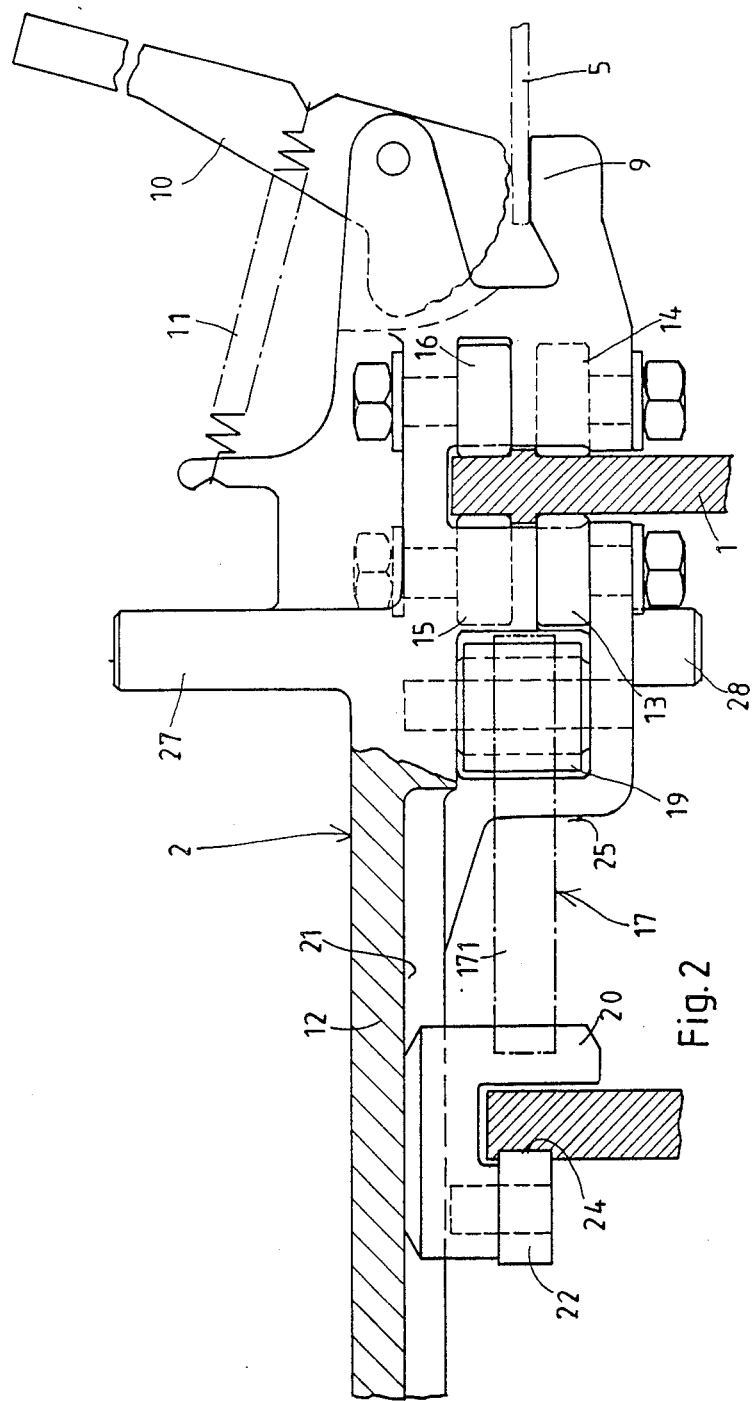

First the construction of a gripping device 2 will be described with reference to FIGS. 2 and 3. Each gripping device 2 has a tension table 9 and a tension lever 10, which is tensioned by a spring 11 and may grip the border of the film web 5 in the usual manner. Opposite to the tension table 9, an extension arm 12 is arranged transversely to the moving direction of the gripping device 2. The moving mechanism of the gripping device comprises four rollers 13, 14, 15, 16, which are arranged in pairs each in two planes and are staggered in regard to one another. The rollers 13 and 14 are positioned in a lower plane and on different sides of the transverse axis of the gripping device. The rollers 15 and 16 are positioned in an upper plane and also on different sides of the transverse axis of the gripping device. The rollers 13, 14, 15, 16 run on specific runways of the transport rail 1. This arrangement has proved very successful for the bearing of moments about the vertical axis and about the transverse axis. For the transport of the gripping devices 2 by deflection wheels or other conveying means, in each case an upper pin 27 and a lower pin 28 is provided approximately in the vertical plane of the connecting elements.

A connecting element 17 in the form of a link chain or a multiple lamella chain with rolling hinge bolts is firmly clamped, on the one side, in a receiver 18 of a gripping device 2. The other end is guided to the specific adjacent gripping device and extends, via a deflection roller 19, to a slide 20, which, on a guideway 21 of the extension arm, is slidable transversely to the moving direction of the gripping devices. The slide 20 comprises a guide roller 22, which rolls in a guide track 24 of a guide rail 23. The multiple lamella chain $\underline{17}$ extends approximately in the central plane of the transport mechanism, consisting of the rollers 13, 14, 15, 16. One multiple lamella chain section 172 extends approximately through the axis of the pins 27 and 28 in parallel with the transport rail. The deflected multiple lamella chain section 171 extends in the plane, determined by the vertical axis of the gripping device 2, or the moving mechanism, respectively, and the tension table 9. Thereby the creation of moments during the run of the gripping device is avoided to a large extent.

Each multiple lamella chain 17 has a constant and steady length. In compliance with the displacement of the slide 20 on the extension arm 12, the length of the multiple lamella chain section 172 between neighbouring gripping devices is changed so that by the displacement of the slide 20 the distance of the gripping devices can be influenced directly. When the guide rail 23 extends in parallel with the transport rail 1, the distance between the gripping devices obviously does not change. However, when the guide rail 23 extends convergently in regard to the transport rail 1, then the multiple lamella chain section 172 becomes longer so that accordingly the distance between the gripping devices increases, as it is required in the stretching zone. In FIG. 1, the extension arms of the gripping devices are schematized by the multiple lamella chain sections 171 and the guide rollers 22.

A corresponding arrangement of the guide rail 23 is shown in FIG. 1 for the stretching zone. The guide rail 23 may be arranged adjustably. It may also possess for each individual section of the stretching zone a different convergence in regard to the transport rail 1 so that the longitudinal stretching ratio within the stretching zone is variable in a continuously variable and pointwise manner by the configuration of the guide rail 23.

In the return path, the gripping devices 2 run over the largest part of the return path at the maximum distance, the slide 20 abutting a limit stop 25 of the gripping device body. Consequently, the gripping device chain is expanded to the maximum length in this condition. In the last part of the return path, FIG. 1 being not to scale in this regard, again a guide rail 231 is provided, on which the specific guide roller 22 runs and draws the slide 20 on the extension arm 12 outwards so that thereby the gripping devices 2 are moved together. The guide rail 231 is elastic and/or adjustable in the direction of the double arrow 26, in order to compensate thereby alterations of the longitudinal stretching ratio and other changes in length of the machine.

Immediately before the inlet deflection arc 3, a gripping device conveying means in the form of a conveying wheel 29 is provided, which, by recesses, grasps the upper pins 27 and/or lower pins 28 of the gripping devices 2 and pushes the gripping devices 2 in a compressed condition and in a dense packing through the deflection arc 3. A corresponding conveying wheel 30 is situated at the end of the preheating zone 4 and at the beginning of the stretching zone 6. The wheel retains the gripping devices so that the gripping devices are moved within the entire region between the conveying wheels 29 and 30 at the smallest distance therebetween. The gripping devices are finally drawn through the stretching zone 6 and the fixing zone 7 by the deflection wheel 8, the longitudinal distances of the gripping devices 2 are determined by the guide rails 23.

On the output of the inlet deflection loop, an opening device 31 is provided, which opens the tension levers of the gripping device. The opening device 31 has a smaller diameter than the inlet deflection arc and is arranged eccentrically in regard to the inlet deflection arc. It may be a wheel. A corresponding opening device 32 is situated at the end of the fixing zone 7 still at a distance before the deflection wheel 8. This opening device 32 open the tension levers 10 of the gripping devices and thereby releases the film web. On the last path section before the deflection wheel, the guide rails 232 are guided so close to the transport rails 2 that in each case the slide 20 comes in contact on the limit stop 25 of the gripping device 2 so that the gripping devices 2 are moved to the greatest distance from one another prior to being grasped by the deflection wheel 8.

I claim the following:

1. A simultaneous biaxial stretching machine for thermoplastic film webs, comprising:
   two transport rails each arranged on a border of the film web,
   two guide rails each extending adjacent to a transport rail at a variable, adjustable distance, and
   gripping devices disposed on said transport rails for gripping the borders of the film web, each gripping device comprising:
   gripping means for gripping the film web,
   roller means for moving the gripping device along its transport rail,
   flexible connecting elements coupling the gripping device to adjacent gripping devices,
   a deflection roller for deflection of a connecting element coming from an adjacent gripping device, and
   an extension arm oriented perpendicularly to the moving direction of the gripping device on the transport rail, said extension arm having a slide mounted on a guide rail and connected to the deflected end of the connecting element.

2. Simultaneous biaxial stretching machine according to claim 1, wherein the slide comprises a guide roller which rolls on the guide rail.

3. Simultaneous biaxial stretching machine according to claim 2, wherein the moving direction of the slide and of the deflected connecting element intersects the vertical axis of symmetry of the roller means of the gripping device.

4. Simultaneous biaxial stretching machine according to claim 3, wherein all the connecting elements are situated in the same horizontal plane, which coincides approximately with the center of the gripping device roller means.

5. Simultaneous biaxial stretching machine according to claim 4, wherein the said horizontal plane is situated in one plane with the guide roller and the film gripping position of the gripping means.

6. Simultaneous biaxial stretching machine according to claim 4, wherein said roller means comprises upper rollers and lower rollers and wherein the horizontal plane of the connecting elements is positioned not higher than the center of the upper rollers and not deeper than the center of the lower rollers.

7. Simultaneous biaxial stretching machine according to claim 6, wherein all the connecting elements extend in one line in parallel with the transport rail.

8. Simultaneous biaxial stretching machine according to claim 7, wherein the guide rail comprises a guide track for the guide roller.

9. Simultaneous biaxial stretching machine according to claim 8, wherein each gripping device has a limit stop means and the slide is movable up to the limit-stop on the gripping device whereby the connecting elements reach their maximum length in the moving direction.

10. Simultaneous biaxial stretching machine according to claim 9, further comprising an outlet deflection guide disposed on the transport rail and wherein the gripping devices are guided on the transport rail section alone subsequent to the outlet deflection guide along a return path.

11. Simultaneous biaxial stretching machine according to claim 10, wherein the gripping devices contain driving pins arranged in the vertical plane of the connecting elements running in parallel with the transport rail.

12. Simultaneous biaxial stretching machine according to claim 11, wherein an upper driving pin and a lower driving pin are provided.

13. Simultaneous biaxial stretching machine according to claim 12 wherein said gripping means comprises a tension lever and wherein an opening device is provided for the tension levers of the gripping devices at the inlet to a preheating zone, said opening device having a smaller diameter than the inlet deflection arc of the transport rails, the opening device being arranged eccentrically in regard to the inlet deflection arc.

14. Simultaneous biaxial stretching machine according to claim 13, further comprising a gripping device transport means disposed before the inlet deflection arc, which compresses the expanded gripping device connecting element and guides same in compressed packing through the inlet deflection arc.

15. Simultaneous biaxial stretching machine according to claim 14, wherein each connecting element is provided as a multiple lamella chain with rolling hinge bolts.

* * * * *